US012790473B2

(12) United States Patent
Zhong et al.

(10) Patent No.: US 12,790,473 B2
(45) Date of Patent: Nov. 10, 2026

(54) IMPACT RESISTANT POLYPROPYLENE POLYMER COMPOSITION HAVING REDUCED VOC CONTENT

(71) Applicant: W.R. Grace & Co.-Conn., Columbia, MD (US)

(72) Inventors: Jing Zhong, Columbia, MD (US); John Kaarto, Missouri City, TX (US); Jonathan Reeds, Columbia, MD (US); Amaia Montoya, Fulton, MD (US)

(73) Assignee: W.R. Grace & Co.-Conn, Columbia, MD (US)

( * ) Notice: Subject to any disclaimer, the term of this patent is extended or adjusted under 35 U.S.C. 154(b) by 577 days.

(21) Appl. No.: 18/030,255

(22) PCT Filed: Oct. 14, 2021

(86) PCT No.: PCT/US2021/054981
§ 371 (c)(1),
(2) Date: Apr. 4, 2023

(87) PCT Pub. No.: WO2022/086782
PCT Pub. Date: Apr. 28, 2022

(65) Prior Publication Data

US 2023/0374283 A1 Nov. 23, 2023

Related U.S. Application Data

(60) Provisional application No. 63/104,824, filed on Oct. 23, 2020.

(51) Int. Cl.

| | |
|---|---|
| ***C08L 23/12*** | (2006.01) |
| ***B65D 6/00*** | (2006.01) |
| ***C08F 110/06*** | (2006.01) |
| ***C08F 210/06*** | (2006.01) |
| ***C08L 23/16*** | (2006.01) |

(52) U.S. Cl.
CPC ............... *C08L 23/12* (2013.01); *B65D 11/20* (2013.01); *C08L 2203/30* (2013.01); *C08L 2205/025* (2013.01); *C08L 2314/02* (2013.01)

(58) Field of Classification Search
None
See application file for complete search history.

(56) References Cited

U.S. PATENT DOCUMENTS

| | | | | |
|---|---|---|---|---|
| 8,207,271 | B2 | 6/2012 | Denifl et al. | |
| 11,421,055 | B2 | 8/2022 | Van Egmond et al. | |
| 2006/0009586 | A1 | 1/2006 | Aguirre et al. | |
| 2009/0209706 | A1* | 8/2009 | Sheard .................... | C08L 23/12 526/348 |
| 2010/0168342 | A1* | 7/2010 | Sheard .................... | C08F 10/06 525/249 |
| 2011/0060075 | A1 | 3/2011 | Oobayashi | |
| 2017/0022308 | A1 | 1/2017 | Meka et al. | |

FOREIGN PATENT DOCUMENTS

| | | | |
|---|---|---|---|
| JP | 2011111587 | A * | 6/2011 |
| RU | 2 518 065 | C2 | 6/2014 |
| WO | WO 2015/100374 | A | 7/2015 |

OTHER PUBLICATIONS

Kabanov et al., Abstract Encyclopedia of Polymers, Sovetskaya entsiklopeiya publishing house, vol. 3, 1977; col. 1012, lines 4-15, 4 pages.
Moskvichev et al., Abstract Basic Theory of Chemical Technology; $2^{nd}$ edition, St. Petersburg-Moscow-Kransnodar, 206, 4 pages.
Russian Search Report for 2023111002, dated March 19m, 2025, 2 pages.
International Search Report and Written Opinion on PCT PCT/US2021/054981 Dtd Mar. 18, 2022, 11 pages.
Supplementary European Search Report for EP21883582 mailed on Aug. 9, 2024,3 pages.
Translation of Japanese Office Action, for JP Application No. 2023-524617, dated Sep. 3, 2025, 6 pages.

* cited by examiner

*Primary Examiner* — Ha S Nguyen
(74) *Attorney, Agent, or Firm* — Dority & Manning, P.A.

(57) ABSTRACT

Polymer compositions are disclosed that contain a heterophasic polypropylene polymer. The polymer composition includes a first polymer phase that may comprise a polypropylene homopolymer and a second polymer phase that may comprise a rubber-like propylene-ethylene random copolymer. The polymer composition is made using Ziegler-Natta catalyst that results in a dramatically reduced VOC and oligomer content.

19 Claims, No Drawings

IMPACT RESISTANT POLYPROPYLENE POLYMER COMPOSITION HAVING REDUCED VOC CONTENT

RELATED APPLICATIONS

The present application is a U.S. National Stage of International Patent Application No. PCT/US2021/054981, filed Oct. 14, 2021, which claims priority to U.S. Provisional Patent Application Ser. No. 63/104,824, filed Oct. 23, 2020, both of which are incorporated herein by reference.

BACKGROUND

The roll of plastics in the daily life of modern consumers is extensive. For example, polyolefin polymers, such as polypropylene polymers, find extensive use in the production of various molded articles through injection molding, blow molding, and thermoforming. One challenge for the production of polypropylene polymers, however, is the presence of low molecular weight oligomers and volatile organic compounds, commonly referred to as VOC's. Volatile organic compounds are produced as part of the polymer manufacturing process. Higher levels of volatile organic compounds can effect product quality, the ability to efficiently process the polymer downstream, and can make it difficult to meet environmental regulations and controls. Typically, these impurities are difficult or expensive to reduce using conventional means in the final product after initial production of the polymer.

One type of polypropylene polymers are heterophasic polymers that have high impact resistance. These polymers can include, for instance, a polypropylene homopolymer matrix blended with a rubber-like propylene-alpha-olefin copolymer phase. The copolymer phase is intended to increase impact resistance. The propylene-alpha-olefin copolymer can be mostly amorphous and thus has elastomeric properties forming a rubber phase within the polymer composition. The existence of oligomers and volatile organic compounds contained within heterophasic polymers is particularly problematic.

In the past, various efforts have been taken in order to reduce oligomers and volatile organic compounds in polypropylene polymers by adjusting the polymerization process or catalyst. For example, U.S. Pat. No. 8,106,138, which is incorporated herein by reference, is directed to producing random propylene-alpha-olefin copolymer compositions and indicates that the provision of one or more external electron donors in the catalyst composition can affect the oligomer level, which are the lower molecular weight portions of the polymer produced that can lead to an increase in VOC's.

Although the '138 patent has provided great advancements in the art, further improvements are still needed. The present disclosure is particularly directed to producing heterophasic polypropylene polymers with reduced volatile organic content and/or reduced oligomer levels.

SUMMARY

In general, the present disclosure is directed to an impact resistant polymer that can be produced with reduced volatile organic compounds, such as reduced oligomer content. In one aspect, the polymer can be produced using a Ziegler-Natta catalyst system that includes a unique internal electron donor in combination with one or more external electron donors. In addition to lower oligomer content, heterophasic polymers produced according to the present disclosure may also have more uniform comonomer distribution in the rubber-like random polypropylene copolymer.

In one embodiment, for instance, the present disclosure is directed to a polymer composition including a first polymer phase combined or blended with a second polymer phase. The first polymer phase (matrix phase) comprises a polypropylene polymer, such as a polypropylene homopolymer polymer or a polypropylene random copolymer. The second polymer phase (dispersed phase), on the other hand, comprises a random propylene ethylene copolymer having rubber-like properties. The propylene ethylene copolymer can contain ethylene in an amount generally from about 20% to about 55% by weight, such as in an amount from about 30% to about 45% by weight. The second polymer phase is present in an amount of from about 10% to about 45% by weight.

In accordance with the present disclosure, the polymer composition as described above has a total oligomer content expressed by the following equation:

$$\text{total oligomer} < 260 * \text{MFR}^{0.32}$$

Total oligomer content, as used herein, includes the total of C12 oligomers, C15 oligomers, C18 oligomers, and C21 oligomers. The total oligomer content of the polymer composition can be less than about 1100 ppm, such as less than about 1000 ppm, such as less than about 800 ppm.

The polymer composition can also have a volatile organic compound content of less than about 70 ppm, such as less than about 50 ppm. As used herein, the content of volatile organic compounds is measured within 48 hours after the heterophasic polymer is produced.

The polypropylene composition of the present disclosure can have a melt flow rate of about 2 g/10 min or greater, such as from about 5 g/10 min to about 500 g/10 min when tested at a temperature of 230° C. and at a load of 2.16 kg. The second phase of the polypropylene composition can also have a Koenig B value of about 0.85 or greater, such as from about 0.86 to about 1.

In one aspect, the C12 oligomer content is less than about 300 ppm at a melt flow rate of up to 300 g/10 min, is less than about 200 ppm at a melt flow rate of up to 150 g/10 min, and is less than about 100 ppm at a melt flow rate of up to 25 g/10 min. The polymer composition can have a total oligomer content of less than 1000 ppm with a melt flow rate of lower than 80 g/10 min. The polymer composition can have a C12 VOC content of less than 15 ppm, such as less than about 12 ppm.

The total ethylene content contained within the first polymer phase and the second polymer phase of the polymer composition can be generally from about 10% by weight to about 45% by weight, such as from about 15% by weight to about 35% by weight. The xylene soluble content in the first polymer phase can generally be less than about 6% by weight, such as less than about 4% by weight, such as less than about 2% by weight.

The polymer composition of the present disclosure can be formed in the presence of a Ziegler-Natta catalyst. In one aspect, the first polymer phase can be formed in a first reactor and the second polymer phase can be formed in a second reactor in the presence of the first polymer phase. In this manner, the second polymer phase can be in the form of polymer particles dispersed within the first polymer phase. In one aspect, the Ziegler-Natta catalyst used in accordance with the present disclosure can include an internal electron donor. Residual amounts of the internal electron donor can remain in the polymer composition. The internal electron donor can generally have the following chemical structure:

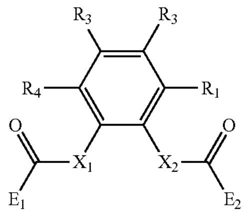

wherein $R_1$ and $R_4$ are each a hydrocarbyl group having from 1 to 20 carbon atoms, and wherein at least one of $R_2$ and $R_3$ is hydrogen, and wherein at least one of $R_2$ and $R_3$ comprises a substituted or unsubstituted hydrocarbyl group having from 5 to 15 carbon atoms, the hydrocarbyl group having a branched or linear structure or comprising a cycloalkyl group having from 4 to 15 carbon atoms, and where $E_1$ and $E_2$ are the same or different and selected from the group consisting of an alkyl having 1 to 20 carbon atoms, a substituted alkyl having 1 to 20 carbon atoms, an aryl having 6 to 20 carbon atoms, a substituted aryl having 6 to 20 carbon atoms, or an inert functional group having 1 to 20 carbon atoms and optionally containing heteroatoms, and wherein $X_1$ and $X_2$ are each O, S, or $NR_5$ and wherein $R_5$ is a hydrocarbyl group having 1 to 20 carbon atoms or is hydrogen.

In one aspect, $R_2$ and $R_3$ of the internal electron donor above comprises a 3-pentyl group, a 2-pentyl group, a cyclohexyl group, a cycloheptyl group, or a cyclooctyl group.

In one aspect $R_1$ and $R_4$ are the same and can be linear hydrocarbyl groups. For instance, in one particular embodiment, $R_1$ and $R_4$ are methyl groups. $E_1$ and $E_2$, in one aspect, both comprise phenyl groups.

Various different types of molded articles can be made from the polypropylene composition described above. In one embodiment, molded articles can be produced through injection molding. Molded articles that can be produced according to the present disclosure include storage containers, such as storage containers that comprise food packaging. Molded articles made according to the present disclosure can also comprise housewares, automotive interior parts, and consumer appliance parts.

In addition to the polymer compositions, the present disclosure is also directed to a method of producing a heterophasic polypropylene polymer. The process includes forming a first polymer phase as descried above in a first reactor and then forming a second polymer phase in a second reactor in the present of the first polymer phase. In accordance with the present disclosure, the heterophasic polymer is produced in the presence of a Ziegler-Natta catalyst incorporating an internal electron donor as described above. In addition, one or more external electron donors may be present. For instance, the external electron donor can comprise a silicon compound, such as n-propyltrimethoxysilane.

Other features and aspects of the present disclosure are discussed in greater detail below.

Definitions and Testing Procedures

Melt flow rate (MFR), as used herein, is measured in accordance with the ASTI D 1238 test method at 230° C. with a 2.16 kg weight for propylene-based polymers.

Xylene solubles (XS) is defined as the weight percent of resin that remains in solution after a sample of polypropylene random copolymer resin is dissolved in hot xylene and the solution is allowed to cool to 25° C. This is also referred to as the gravimetric XS method according to ASTM D5492-06 using a 60 minute or 90 minute precipitation time and is also referred to herein as the "wet method".

The ASTM D5492-06 method mentioned above is used to determine the xylene soluble portion. In general, the procedure consists of weighing 2 g of sample and dissolving the sample in 200 ml o-xylene in a 400 ml flask with 24/40 joint. The flask is connected to a water cooled condenser and the contents are stirred and heated to reflux under nitrogen (N2), and then maintained at reflux for an additional 30 minutes. The solution is then cooled in a temperature controlled water bath at 25° C. for 60 minutes to allow the crystallization of the xylene insoluble fraction. Once the solution is cooled and the insoluble fraction precipitates from the solution, the separation of the xylene soluble portion (XS) from the xylene insoluble portion (XI) is achieved by filtering through 25 micron filter paper. One hundred ml of the filtrate is collected into a pre-weighed aluminum pan, and the o-xylene is evaporated from this 100 ml of filtrate under a nitrogen stream. Once the solvent is evaporated, the pan and contents are placed in a 100° C. vacuum oven for 30 minutes or until dry. The pan is then allowed to cool to room temperature and weighed. The xylene soluble portion is calculated as XS (wt %)=[(m3−m2)*2/ml]*100, where ml is the original weight of the sample used, m2 is the weight of empty aluminum pan, and m3 is the weight of the pan and residue (the asterisk, *, here and elsewhere in the disclosure indicates that the identified terms or values are multiplied).

XS can also be measured according to the Viscotek method, which is also referred to as the Flow Injection Polymer Analysis method, as follows: 0.4 g of polymer is dissolved in 20 ml of xylenes with stirring at 130° C. for 60 minutes. The solution is then cooled to 25° C. and after 60 minutes the insoluble polymer fraction is filtered off. The resulting filtrate is analyzed by Flow Injection Polymer Analysis using a Viscotek ViscoGEL H-100-3078 column with THF mobile phase flowing at 1.0 ml/min. The column is coupled to a Viscotek Model 302 Triple Detector Array, with light scattering, viscometer and refractometer detectors operating at 45° C. Instrument calibration is maintained with Viscotek PolyCAL™ polystyrene standards. A polypropylene (PP) homopolymer, such as biaxially oriented polypropylene (BOPP) grade, is used as a reference material to ensure that the Viscotek instrument and sample preparation procedures provide consistent results. The value for the reference polypropylene homopolymer, is initially derived from testing using the ASTM method identified above.

IZOD impact strength is measured in accordance with ASTM D 256 on specimens molded according to ASTM D4101.

Flexural modulus is determined in accordance with ASTM D790-10 Method A at 1.3 mm/min, using a Type I specimen per ASTM D3641 and molded according to ASTM D4101.

Mw/Mn (also referred to as "MWD") and Mz/Mw are measured by GPC according to the Gel Permeation Chromatography (GPC) Analytical Method for Polypropylene as described below. The polymers are analyzed on a PL-220 series high temperature gel permeation chromatography (GPC) unit equipped with a refractometer detector and four PLgel Mixed A (20 μm) columns (Polymer Laboratory Inc.). The oven temperature is set at 150° C. and the temperatures of the autosampler's hot and the warm zones are at 135° C.

and 130° C. respectively. The solvent is nitrogen purged 1,2,4-trichlorobenzene (TCB) containing ~200 ppm 2,6-di-t-butyl-4-methylphenol (BHT). The flow rate is 1.0 mL/min and the injection volume was 200 µl. A 2 mg/mL sample concentration is prepared by dissolving the sample in nitrogen (N2) purged and preheated TCB (containing 200 ppm BHT) for 2.5 hrs at 160° C. with gentle agitation.

The GPC column set is calibrated by running twenty narrow molecular weight distribution polystyrene (PS) standards. The molecular weight (MW) of the standards ranges from 580 to 8,400,000 g/mol, and the standards were contained in 6 "cocktail" mixtures. Each standard mixture has at least a decade of separation between individual molecular weights. The polystyrene standards are prepared at 0.005 g in 20 mL of solvent for molecular weights equal to or greater than 1,000,000 g/mol and 0.001 g in 20 mL of solvent for molecular weights less than 1,000,000 g/mol. The polystyrene standards are dissolved at 150° C. for 30 min under stirring. The narrow standards mixtures are run first and in order of decreasing highest molecular weight component to minimize degradation effect. A logarithmic molecular weight calibration is generated using a fourth-order polynomial fit as a function of elution volume. The equivalent polypropylene (PP) molecular weights are calculated by using following equation with reported Mark-Houwink coefficients for polypropylene (Th. G. Scholte, N. L. J. Meijerink, H. M. Schoffeleers, and A. M. G. Brands, J. Appl. Polym. Sci., 29, 3763-3782 (1984)) and polystyrene(E. P. Otocka, R. J. Roe, N. Y. Hellman, P. M. Muglia, Macromolecules, 4, 507 (1971)):

$$M_{pp} = \frac{\left(K_{ps} M_{ps}^{\alpha_{ps}+1}\right)^{\frac{1}{\alpha_{pp}+1}}}{K_{pp}}$$

where Mpp is PP equivalent MW. MPS is PS equivalent MW, log K and a values of Mark-Houwink coefficients for PP and PS are listed below in Table 1.

TABLE 1

| Polymer | A | Log K |
|---|---|---|
| Polypropylene | 0.725 | −3.721 |
| Polystyrene | 0.702 | −3.900 |

The "fraction of copolymer" or "amount of rubber" of a heterophasic copolymer is the percent weight (wt. %) of the discontinuous phase (see "Polypropylene and Other Polyolefins" by Ser Van Der Ven, Elsevier, 1990, Chapter 13.2.2) This is designated as "Fc." The composition or "ethylene content" of the rubber phase is the percent weight (wt. %) of ethylene in the discontinuous phase. This is designated as "Ec". The weight percent of ethylene based on the total weight of the propylene impact copolymer is designated as "Et." The impact copolymer composition is measured by a Fourier Transformation Infrared (FTIR) method which measures the total amount of ethylene in the impact copolymer (Et in wt %) and the amount of ethylene in the rubber fraction (Ec in wt %). The method is used for impact copolymers that have pure propylene homopolymer as the first reactor component and pure ethylene-propylene rubber (EPR) as the second reactor component. The amount of rubber fraction (Fc in wt %) follows from the relationship:

$$Et=Ec*Fc/100$$

Equivalent values of Et, Ec and Fc can be obtained by combining the amount of rubber fraction with the total ethylene content. As is well known in the art, the amount of rubber can be obtained from a mass balance of the reactors or from measurement of the titanium or magnesium residues from the first and second reactor products employing well known analytical methods. The total ethylene content of the impact copolymer can be measured by a variety of methods which include 1. FTIR by ASTM D 5576-00; 2. $^{13}$C-NMR by S. Di Martino and M. Kelchtermans, "Determination of the Composition of Ethylene-Propylene Rubbers Using .sup.13C NMR Spectroscopy", Journal of Applied Polymer Science, Vol. 56, 1781-1787 (1995); 3. J. C. Randall, "A Review of High Resolution Liquid 13C NMR Characterizations of Ethylene-Based Polymers", Journal of Macromolecular Science—Reviews of Macromolecular Chemical Physics, Ch. 29, 201-317 (1989); and 4. The methods detailed in United States Published Patent Application 2004/0215404, which is incorporated herein by reference or the methods detailed in United States Published Patent Application 2011/0015316, which is incorporated herein by reference.

The polypropylene composition can also be measured by $^{13}$C-NMR. The samples are prepared by adding approximately 2.7 g of a 50/50 mixture of tetrachloroethane-d2/orthodichlorobenzene containing 0.025 M Cr(AcAc)3 to 0.20 g sample in a Norell 1001-7 10 mm NMR tube. The samples are dissolved and homogenized by heating the tube and its contents to 150° C. using a heating block. Each sample is visually inspected to ensure homogeneity. The data are collected using a Bruker 400 MHz spectrometer equipped with a Bruker Dual DUL high-temperature CryoProbe. The data are acquired using 500 transients per data tile, a 6 sec pulse repetition delay, 90 degree flip angles, and inverse gated decoupling with a sample temperature of 120° C. All measurements are made on non-spinning samples in locked mode Samples are allowed to thermally equilibrate for 10 minutes prior to data acquisition.

NMR data for impact copolymers were analyzed for total ethylene (Et), ethylene content of the rubber phase (Ec) and weight percent rubber present (Fc) using a method similar to that described by Randall. The method subtracts the homopolymer fraction contribution from the whole spectrum by comparing total PPP triad area to that estimated for the copolymer fraction. The PPP area contribution from the copolymer fraction is determined based on a statistical fit of two first-order Markovian models to the data without the PPP contributions. The weight fraction rubber (Fc) is determined by comparing the relative contributions from the homopolymer PPP and the total spectrum area. Et determination is straightforward. The ethylene content of the rubber phase (Ec) is then determined as Et/Fc*100.

Ethylene content was calculated based on the triads distribution. The assignment of chemical shift of triads is shown in Table 1.

$$PPP=(F+A-0.5D)/2$$

$$PPE=D$$

$$EPE=C$$

$$EEE=(E-0.5G)/2$$

$$PEE=G$$

$$PEP=H$$

The ethylene content is based on the following calculations:

mols $P$=sum $P$ centered triads mols $E$=sum $E$ centered triads

TABLE 1

Assignment of chemical shift to triad for ethylene propylene copolymer

| | Chem.l shift δ (ppm) | Triad | Carbon type | Chem. shift range | Region |
|---|---|---|---|---|---|
| 1 | 44-49 | PPE | $CH_2$ | 44.0-49.0 | A |
| 2 | | PPP | $CH_2$ | | |
| 3 | 37.8 | EPE(P) | $CH_2$ | 36.0-39.0 | B |
| 4 | 37.4 | EPE(E) | $CH_2$ | | |
| 5 | 33.2 | EPE | CH | 32.8-34.0 | C |
| 6 | 31.0 | PPE | CH | 31.00 | D |
| 7 | 30.8 | PEE(P) | $CH_2$ | 29.7-30.8 | E |
| 8 | 30.4 | PEE(E) | $CH_2$ | | |
| 9 | 30.0 | EEE | $CH_2$ | | |
| 10 | 28.8 | PPP | $CH_2$ | 28.0-29.7 | F |
| 11 | 27.3 | EEP | $CH_2$ | 26.0-28.3 | G |
| 12 | 24.6 | PEP | $CH_2$ | 24.0-26.0 | H |
| 13 | 21.6 | PPP | $CH_2$ | 19.0-23.0 | I |
| 14 | 20.8 | PPE | $CH_2$ | | |
| 15 | 20.0 | EPE | $CH_2$ | | |

The term Koenig B (rubber) value is a measurement of the comonomer distribution across a polymer chain of the EPR rubber in the ICP. The B (rubber) calculates the distribution of the ethylene units of a copolymer of propylene and ethylene (EPR rubber) across the EPR polymer chain. B (rubber) values range from 0 to 2. With 1 designating a perfectly random distribution of comonomer units. The higher the B(rubber) value, the more alternating the comonomer distribution in the EPR rubber phase. The lower the B(rubber) value, the more clustered the comonomer distribution in the EPR rubber phase.

The B (rubber) value is determined according to the method of J. L. Koenig (Spectroscopy of Polymers, 2"d Edition, Elsevier, 1999). B (rubber) is defined as:

$$B(\text{rubber}) = \frac{f(PE+EP)}{2*f(E)*f(P)}$$

where, f(PE) represents the sum of mole fraction of dyad PE fractions and EP fractions in rubber, it can be derived from the following triad data: f(PE+EP)=[PEE]+[EPE]+[EPP]+[PEP].

f(E) and f(F) represent the mole fraction of ethylene and propylene in rubber, respectively. f(E)=[EEE]+[EEP]+[PEE]+[PEP], and f(P)=[EPE]+[EPP]+[PPE]4+[PPP].

Volatiles content is measured by the static Headspace Analysis described in the textbook: Pyrolysis and GC in Polymer Analysis, edited by S. A. Liebman and E. J. Levy, Marcel Dekker, Inc., 1985. The gas chromatography/headspace gas chromatography (GC-1-IS) analysis is widely used in the automotive industry. The company Volkswagen AG has developed a standard, which is generally accepted and used in the plastic industry. It is known as "VW standard PV 3341" (or "PV3341" and also known as German Automotive Standard test VDA-277) PV3341 is a test in which a sample of 2 grams is placed into a headspace vial, conditioned for 5 hours at 120° C. and then gas from the vial headspace is injected directly into a GC. Quantification is accomplished using an external standard technique based on peak area response of acetone standards. As used herein, VOC measurements are measured on fresh powders within 5 hours of production of the heterophasic polymer without air purging.

Individual volatile chemicals are also measured by gas chromatography/headspace gas chromatography (GC-HS) analysis. Liquid standards in chlorobenzene which contains polar analytes and hydrocarbons greater than C5 are used for retention time calibration. Acetone in BuOH is used for quantification calibration. C12s is summed peak region from n-C9 (not included) to n-C12.

Oligomer content is measured by gas chromatography using Shimadzu GC-2010 instrument. 0.5 g of polypropylene powders are extracted in 5 g of internal standard solution which is a chloroform solvent with 66 ppm of n-hexadecane for 20 h. The oligomer content is calculated as n-hexadecane equivalent. Substances of C12, C15, C18 and C21 are determined and analyzed. As used herein, the total oligomer content is a combination of the amount of C12 oligomers, C15 oligomers, C18 oligomers, and C21 oligomers.

DETAILED DESCRIPTION

It is to be understood by one of ordinary skill in the art that the present discussion is a description of exemplary embodiments only and is not intended as limiting the broader aspects of the present disclosure.

In general, the present disclosure is directed to a polymer composition having excellent impact resistance properties in combination with an extremely low content of volatile organic compounds. The polymer composition generally includes a heterophasic polymer containing an alpha-olefin and propylene random copolymer dispersed within a polypropylene matrix polymer. The polypropylene random copolymer, which can be an ethylene-propylene rubber, has rubber-like properties that greatly enhances the impact resistance properties of the overall polymer composition.

In order to produce the polymer composition with a low content of volatile organic compounds, the polymer can be formed in the presence of a Ziegler-Natta catalyst that is phthalate-free. The catalyst system can include an internal electron donor that comprises a particular substituted phenylene aromatic diester. The catalyst system can also include one or more external electron donors that, in one aspect, comprises a silicon compound. The catalyst system of the present disclosure can produce a higher hydrogen response. In addition, the catalyst activity can remain relatively constant and uniform during production of the heterophasic polymer. For example, the heterophasic polymer is typically formed in two different phases in which a first polymer phase is produced and a second polymer phase is produced in in the presence of the first polymer phase. Multiple reactors may be used to produce the heterophasic polymer. The catalyst system of the present disclosure has been found to have a relatively uniform activity during the formation of each polymer phase which is believed to lower the resulting content of VOC's or polymer oligomers.

In addition, polymer compositions of the present disclosure can also be formed in which the ethylene is uniformly distributed within the propylene and ethylene rubber. Polymers made according to the present disclosure can also have a relatively narrow molecular weight distribution in comparison with polymers produced with other Ziegler-Natta catalysts.

The content of volatile organic compounds contained in the heterophasic polymer composition, for instance, can generally be less than about 100 ppm, such as less than about 80 ppm, such as less than about 70 ppm, such as less than about 60 ppm, such as less than about 50 ppm. The content of volatile organic compounds is generally greater than about 1 ppm. The content of volatile organic compounds can change over time after the polymer is produced.

The reduction in volatile organic compounds is also analogous to the presence of oligomers in the polymer composition. Of particular advantage, polymer compositions of the present disclosure can contain dramatically reduced levels of oligomers, particularly C12 oligomers, C15 oligomers, C18 oligomers, and C21 oligomers. For example, the polymer composition of the present disclosure can contain a concentration of C12 oligomers in an amount less than about 300 ppm, such as less than about 200 ppm, such as in an amount less than about 180 ppm, such as in an amount less about 160 ppm, such as in an amount less than about 150 ppm, such as in an amount less than about 120 ppm, such as in an amount less than about 110 ppm, such as in an amount less than about 100 ppm, such as in an amount less than about 90 ppm, such as in an amount less than about 80 ppm, such as in an amount less than about 70 ppm, such as in an amount less than about 60 ppm, such as in an amount less than about 50 ppm, such as in an amount less than about 40 ppm. The amount of C12 oligomer that is present in the polymer composition can be generally greater than about 10 ppm. The final oligomer concentration, for instance, can depend upon various factors including the desired molecular weight of the polymer, the melt flow rate of the polymer and/or the ethylene content of the polymer composition.

The polymer composition can contain C15 oligomers generally in an amount less than about 225 ppm, such as in an amount less than about 220 ppm, such as in an amount less than about 200 ppm, such as in an amount less than about 150 ppm, such as in an amount less than about 125 ppm, such as even in an amount less than about 100 ppm. The polymer composition can contain C18 oligomers generally in an amount less than about 275 ppm, such as less than about 250 ppm, such as less than about 200 ppm, such as less than about 150 ppm. The polymer composition can contain C21 oligomers generally in an amount less than about 280 ppm, such as less than about 260 ppm, such as less than about 240 ppm, such as less than about 220 ppm, such as less than about 200 ppm, such as less than about 150 ppm.

The polymer composition of the present disclosure can have a total oligomer content expressed by the following equation:

$$\text{total oligomer} < 260 * MFR^{0.32}.$$

In one embodiment, the total oligomer content is expressed by the following equation:

$$\text{total oligomer} < 240 * MFR^{0.32}.$$

In one aspect, the polymer composition of the present disclosure can have a total oligomer content of generally less than about 1000 ppm. For example, the total oligomer content can be less than about 950 ppm, such as less than about 900 ppm, such as less than about 800 ppm, such as less than about 700 ppm, such as less than about 600 ppm, such as less than about 500 ppm. The total oligomer content is generally greater than about 10 ppm, such as greater than about 100 ppm. Of particular advantage, the polymer compositions can be made in accordance with the present disclosure having reduced oligomer content while also being phthalate free.

Polymer compositions made according to the present disclosure can also have the above described reduced oligomer content while still having excellent impact resistance properties. The impact resistance properties can be tailored to a particular application by varying the molecular weight and melt flow rate Consequently, the polymer composition is well suited to forming all different types of molded articles. The molded articles can be produced through injection molding, blow molding, or can be thermoformed. In one embodiment, for instance, the polymer composition can be used to form containers, particularly storage containers. In addition to containers and packaging, the polymer composition of the present disclosure can be used to also produce numerous and diverse molded products. For instance, the polymer composition is particularly well suited to producing vehicle parts, such as interior automotive parts. The polymer composition can also be used to form various different types of consumer appliance parts.

In general, the polymer composition of the present disclosure comprises a heterophasic composition. In particular, the polypropylene composition includes a first polymer phase blended with a second polymer phase. At least the second polymer phase is formed from a polypropylene polymer containing controlled amounts of an alpha-olefin, such as ethylene. In one embodiment, the first polymer phase comprises a polypropylene homopolymer. Alternatively, the first polymer phase may comprise a polypropylene random copolymer containing ethylene, wherein ethylene is contained in the polymer in minor amounts, such as less than about 5% by weight, such as less than about 2% by weight, such as less than about 1% by weight. The first polymer phase is generally present in the polymer composition in an amount greater than the second polymer phase and therefore forms a matrix polymer. The second polymer phase, on the other hand, comprises a polypropylene copolymer having elastomeric or rubber-like properties.

The first polymer phase generally has a low xylene soluble content. For instance, the first polymer phase can have a xylene solubles content of less than about 6% by weight, such as less than about 4% by weight. Especially when the first polymer phase is a homopolymer, the first polymer phase may have a xylene solubles content of less than about 2.8% by weight, such as less than about 2.2% by weight, such as less than about 1.8% by weight, such as less than about 1.2% by weight. The xylene solubles content is generally greater than about 0.01% by weight.

As described above, the second polymer phase contains a propylene and ethylene rubber. The second polymer phase, for instance, can contain ethylene in an amount less than propylene. In one aspect, the second polymer phase contains ethylene in an amount greater than about 10% by weight, such as in an amount greater than about 20% by weight, such as in an amount greater than about 25% by weight, such as in an amount greater than about 30% by weight, such as in an amount greater than about 35% by weight. The ethylene content of the second polymer phase is generally less than about 55% by weight, such as less than about 50% by weight, such as less than about 45% by weight, such as less than about 40% by weight.

The polymer composition according to the present disclosure can have an increased randomness of co-monomer distribution across the polymer chains, especially of the rubber-like second phase polymer. For example, the Koenig B value is a measurement of the comonomer distribution and calculates the distribution of the ethylene units of a copolymer of polypropylene and ethylene across the propylene-ethylene rubber chains. The Koenig B value of the second phase polymer of the polymer composition is generally greater than about 0.85, such as greater than about 0.86, such as greater than about 0.87. The Koenig B value of the second phase polymer is generally less than about 1, such as less than about 0.95, such as less than about 0.9.

The total amount of ethylene contained in both the first phase polymer and the second phase polymer can be controlled. For example, the polymer composition of the present disclosure can have a total ethylene content of generally less than about 20% by weight, such as an amount less than about 15% by weight, such as in an amount less than about 13% by weight. The total ethylene content in the polymer composition is generally greater than about 1% by weight, such as greater than about 2% by weight, such as greater than about 3% by weight, such as greater than about 5% by weight.

The first phase polymer generally forms a matrix and the second phase polymer forms particles within the matrix. In the polymer composition of the present disclosure, the second phase polymer particles have a relatively small size. For instance, the second phase polymer particles can have an average particle size (D50) of less than about 5 microns, such as less than about 3 microns, such as less than about 1 micron. The average particle size can be greater than about 0.01 microns, such as greater than about 0.25 microns.

The relative amounts of the different phases contained in the polymer composition can vary depending upon various factors and the desired result. In general, the second polymer phase can be contained in the polypropylene composition in an amount greater than about 10% by weight, such as in an amount greater than about 15% by weight, such as in an amount greater than about 17% by weight, such as in an amount greater than about 20% by weight, and generally in an amount less than about 45% by weight, such as in an amount less than about 35% by weight. For example, the second polymer phase can be present in the composition in an amount greater than about 5% by weight and in an amount less than about 45% by weight including all increments of 1% by weight therebetween.

The above amounts are based upon the total weight of the first polymer phase and the second polymer phase. For example, the first polymer phase is generally contained in the polymer composition in an amount of from about 55% to about 90% by weight, including all increments of 1% by weight therebetween, which is based upon the total weight of the first polymer phase and the second polymer phase.

The first phase polymer and the second phase polymer can be produced using various different polymerization methods and procedures. In one embodiment, a Ziegler-Natta catalyst is used to produce the polymer composition. For example, the olefin polymerization can occur in the presence of a catalyst system that includes a catalyst, an internal electron donor, a cocatalyst, and optionally an external electron donor. Olefins of the formula $CH_2{=}CHR$, where R is hydrogen or a hydrocarbon radical with 1 to 12 atoms, can be contacted with the catalyst system under suitable conditions to form the polymer products. Copolymerization may occur in a method-step process in order to generate the heterophasic composition of the present disclosure. The polymerization process can be carried out using known techniques in the gas phase using fluidized bed or stirred bed reactors or in a slurry phase using an inert hydrocarbon solvent or diluent or liquid monomer.

In one embodiment, the first phase polymer and the second phase polymer can be produced in a two-stage process that includes a first stage, in which the propylene polymer of the continuous polymer phase is prepared, and a second stage, in which the propylene copolymer is produced. The first stage polymerization can be carried out in one or more bulk reactors or in one or more gas phase reactors. The second stage polymerization can be carried out in one or more gas phase reactors. The second stage polymerization is typically carried out directly following the first stage polymerization. For example, the polymerization product recovered from the first polymerization stage can be conveyed directly to the second polymerization stage. In this regard, the polymerization may be performed according to a sequential polymerization process. A heterophasic copolymer composition is produced.

In one embodiment of the present disclosure, the polymerizations are carried out in the presence of a stereoregular olefin polymerization catalyst. For example, the catalyst may be a Ziegler-Natta catalyst. In one aspect, the catalyst system used to produce the heterophasic polymer, for instance, can include a particular type of internal electron donor that is combined with a catalyst precursor. The resulting base catalyst component is then combined with a cocatalyst and one or more external electron donors. The internal electron donor, for instance, can have the following chemical formula.

Formula I

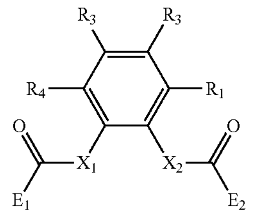

wherein $R_1$ and $R_4$ are each a saturated or unsaturated hydrocarbyl group having from 1 to 20 carbon atoms, and wherein at least one of $R_2$ and $R_3$ is hydrogen, and wherein at least one of $R_2$ and $R_3$ comprises a substituted or unsubstituted hydrocarbyl group having from 6 to 15 carbon atoms, the hydrocarbyl group having a branched or linear structure or comprising a cycloalkyl group having from 4 to 15 carbon atoms, such as from 5 to 15 carbon atoms, aryl and substituted aryl groups, and where $E_1$ and $E_2$ are the same or different and selected from the group consisting of an alkyl having 1 to 20 carbon atoms, a substituted alkyl having 1 to 20 carbon atoms, an aryl having 6 to 20 carbon atoms, a substituted aryl having 6 to 20 carbon atoms, or an inert functional group having 1 to 20 carbon atoms and optionally containing heteroatoms, and wherein $X_1$ and $X_2$ are each O, S, an alkyl group or $NR_5$ and wherein $R_5$ is a hydrocarbyl group having 1 to 20 carbon atoms or is hydrogen.

As used herein, the term "hydrocarbyl" and "hydrocarbon" refer to substituents containing only hydrogen and carbon atoms, including branched or unbranched, saturated or unsaturated, cyclic, polycyclic, fused, or acyclic species, and combinations thereof. Nonlimiting examples of hydrocarbyl groups include alkyl-, cycloalkyl-, alkenyl-, alkadienyl-, cycloalkenyl-, cycloalkadienyl-, aryl-, aralkyl, alkylaryl, and alkynyl-groups.

As used herein, the terms "substituted hydrocarbyl" and "substituted hydrocarbon" refer to a hydrocarbyl group that is substituted with one or more nonhydrocarbyl substituent groups. A nonlimiting example of a nonhydrocarbyl substituent group is a heteroatom. As used herein, a "heteroatom" refers to an atom other than carbon or hydrogen. The heteroatom can be a non-carbon atom from Groups 13, 14, 15, 16 or 17 of the Periodic TableNonlimiting examples of heteroatoms include: halogens (F, Cl, Br, I), N, O, P, B, S, and Si. A substituted hydrocarbyl group also includes a halohydrocarbyl group and a silicon-containing hydrocarbyl group. As used herein, the term "halohydrocarbyl" group refers to a hydrocarbyl group that is substituted with one or more halogen atoms. As used herein, the term "silicon-containing hydrocarbyl group" is a hydrocarbyl group that is substituted with one or more silicon atoms. The silicon atom(s) may or may not be in the carbon chain.

In one embodiment, the above internal electron donor can be combined with a magnesium moiety and a titanium moiety in producing the catalyst composition.

The internal electron donor as shown above with respect to Formula I includes R1 through R4 groups that provide many of the benefits associated with the catalyst composition of the present disclosure. In one embodiment, R1 and R4 are identical or very similar. In one embodiment, for instance, R1 and R4 are linear hydrocarbyl groups. For instance, R1 and R4 may comprise a C1 to C8 alkyl group, a C2 to C8 alkenyl group, or mixtures thereof. For example, in one embodiment, R1 and R4 may both comprise alkyl groups that have the same carbon chain length or vary in carbon chain length by no more than about 3 carbons atoms, such as by no more than about 2 carbon atoms.

In one embodiment, R4 is a methyl group, while R1 is a methyl group, an ethyl group, a propyl group, or a butyl group, or vice versa. In another alternative embodiment, both R1 and R4 are methyl groups, both R1 and R4 are ethyl groups, both R1 and R4 are propyl groups, or both R1 and R4 are butyl groups.

In conjunction with the above described R1 and R4 groups, at least one of R2 or R3 is a substituted group that is larger or bulkier than the R1 and R4 groups. The other of R2 or R3 can be hydrogen. The larger or bulky group situated at R2 or R3, for instance, can be a hydrocarbyl group having a branched or linear structure or may comprise a cycloalkyl group having from 4 to 15 carbon atoms. The cycloalkyl group, for instance, may be a cyclopentyl group, a cyclohexyl group, acycloheptyl group or a cyclooctyl group. When either R2 or R3 has a branched or linear structure, on the other hand, R2 or R3 may be a pentyl group, a hexyl group, a heptyl group, an octyl group, a nonyl group, a decyl group, or the like. For instance, R2 or R3 may be a 3-pentyl group or a 2-pentyl group.

Further examples of internal electron donors made in accordance with the present disclosure are shown below. In each of the below structures, R1 through R4 can be substituted with any of the groups in any of the combinations described above.

Formula II

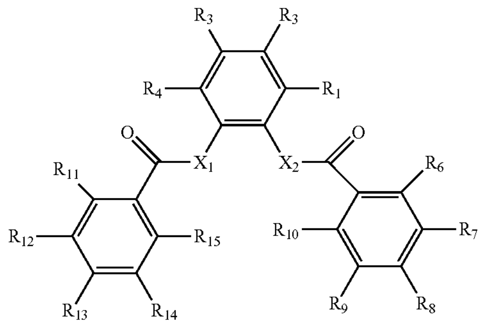

wherein R6 through R15 can be the same or different. Each of R6 through R15 is selected from a hydrogen, substituted hydrocarbyl groups having 1 to 20 carbon atoms, and unsubstituted hydrocarbyl groups having 1 to 20 carbon atoms, an alkoxyl group having 1 to 20 carbon atoms, a hetero atom, and combinations thereof.

The internal electron donor made in accordance with the present disclosure is combined with a catalyst precursor. The catalyst precursor can include (i) magnesium, (ii) a transition metal compound of an element from Periodic Table groups 4 to 8, (iii) a halide, an oxyhalide, and/or an alkoxide of (i) and/or (ii), and (iv) combinations of (i), (ii), and (iii) Nonlimiting examples of suitable catalyst precursors include halides, oxyhalides, and alkoxides of magnesium, manganese, titanium, vanadium, chromium, molybdenum, zirconium, hafnium, and combinations thereof.

In an embodiment, the preparation of the catalyst precursor involves halogenation of mixed magnesium and titanium alkoxides.

In an embodiment, the catalyst precursor is a magnesium moiety compound (MagMo), a mixed magnesium titanium compound (MagTi), or a benzoate-containing magnesium chloride compound (BenMag). In an embodiment, the catalyst precursor is a magnesium moiety ("MagMo") precursor. The MagMo precursor includes a magnesium moiety. Nonlimiting examples of suitable magnesium moieties include anhydrous magnesium chloride and/or its alcohol adduct, magnesium alkoxide or aryloxide, mixed magnesium alkoxy halide, and/or carboxylated magnesium dialkoxide or aryloxide. In one embodiment, the MagMo precursor is a magnesium di($C_{1-4}$)alkoxide. In a further embodiment, the MagMo precursor is diethoxymagnesium.

In an embodiment, the catalyst precursor is a mixed magnesium/titanium compound ("MagTi"). The "MagTi precursor" has the formula $Mg_dTi(OR^e)fX_g$ wherein R is an aliphatic or aromatic hydrocarbon radical having 1 to 14 carbon atoms or COR' wherein R' is an aliphatic or aromatic hydrocarbon radical having 1 to 14 carbon atoms; each $OR^e$ group is the same or different; X is independently chlorine, bromine or iodine, preferably chlorine; d is 0.5 to 56, or 2 to 4; f is 2 to 16 or 5 to 15; and g is 0.5 to 116, or 1 to 3. The precursors are prepared by controlled precipitation through removal of an alcohol from the reaction mixture used in their preparation. In an embodiment, a reaction medium comprises a mixture of an aromatic liquid, especially a chlorinated aromatic compound, most especially chlorobenzene, with an alkanol, especially ethanol. Suitable halogenating agents include titanium tetrabromide, titanium tetrachloride or titanium trichloride, especially titanium tetrachloride. Removal of the alkanol from the solution used in the halogenation, results in precipitation of the solid precursor, having especially desirable morphology and surface area. Moreover, the resulting precursors are particularly uniform in particle size.

In an embodiment, the catalyst precursor is a benzoate-containing magnesium chloride material ("BenMag"). As used herein, a "benzoate-containing magnesium chloride" ("BenMag") can be a catalyst (i.e., a halogenated catalyst precursor) containing a benzoate internal electron donor. The BenMag material may also include a titanium moiety, such as a titanium halide. The benzoate internal donor is labile and can be replaced by other electron donors during catalyst and/or catalyst synthesis. Nonlimiting examples of suitable benzoate groups include ethyl benzoate, methyl benzoate, ethyl p-methoxybenzoate, methyl p-ethoxybenzoate, ethyl p-ethoxybenzoate, ethyl p-chlorobenzoate. In one embodiment, the benzoate group is ethyl benzoate. In an embodiment, the BenMag catalyst precursor may be a product of halogenation of any catalyst precursor (i.e., a MagMo precursor or a MagTi precursor) in the presence of a benzoate compound.

In one embodiment, a substantially spherical $MgCl_{2-n}$EtOH adduct may be formed by a spray crystallization process. In the process, a $MgCl_{2-n}$ROH melt, where n is 1-6, is sprayed inside a vessel while conducting inert gas at a temperature of 20-80° C. into the upper part of the vessel. The melt droplets are transferred to a crystallization area into which inert gas is introduced at a temperature of 50 to 20° C. crystallizing the melt droplets into nonagglomerated, solid particles of spherical shape. The spherical $MgCl_2$ particles are then classified into the desired size. Particles of undesired size can be recycled. In preferred embodiments for catalyst synthesis the spherical $MgCl_2$ precursor has an average particle size (Malvern do) of between about 15-150 microns, preferably between 20-100 microns, and most preferably between 35-85 microns.

The above spherical procatalyst precursor is referred to as a "spray crystallized" catalyst precursor. In one embodiment, the spray crystallized precursor can be dealcoholated. For instance, the spray crystallized treatment can undergo a post-treatment process in order to remove ethanol. For example, the ethanol/magnesium chloride weight ratio can be less than about 3.5:1, such as from about 3:1 to about 1.75:1, such as from about 2.1 to about 2.5:1.

In an embodiment, the catalyst precursor is converted to a solid catalyst by way of halogenation. Halogenation includes contacting the catalyst precursor with a halogenating agent in the presence of the internal electron donor. Halogenation converts the magnesium moiety present in the catalyst precursor into a magnesium halide support upon which the titanium moiety (such as a titanium halide) is deposited. Not wishing to be bound by any particular theory, it is believed that during halogenation the internal electron donor (1) regulates the position of titanium on the magnesium-based support, (2) facilitates conversion of the magnesium and titanium moieties into respective halides and (3) regulates the crystallite size of the magnesium halide support during conversion Thus, provision of the internal electron donor yields a catalyst composition with enhanced stereoselectivity.

In an embodiment, the halogenating agent is a titanium halide having the formula $Ti(OR^e)_fX_h$ wherein $R^e$ and X are defined as above, f is an integer from 0 to 3; h is an integer from 1 to 4; and f+h is 4. In an embodiment, the halogenating agent is $TiCl_4$ in a further embodiment, the halogenation is conducted in the presence of a chlorinated or a non-chlorinated aromatic liquid, such as dichlorobenzene, o-chlorotoluene, chlorobenzene, benzene, toluene, a xylene or mixtures thereof.

As described above, the catalyst composition can include a combination of a magnesium moiety, a titanium moiety and the internal electron donor The catalyst composition is produced by way of the foregoing halogenation procedure which converts the catalyst precursor and the internal electron donor into the combination of the magnesium and titanium moieties, into which the internal electron donor is incorporated. The catalyst precursor from which the catalyst composition is formed can be the magnesium moiety precursor, the mixed magnesium/titanium precursor, the benzoate-containing magnesium chloride precursor or the spherical precursor.

The present disclosure is also directed to a catalyst system that includes the catalyst composition as described above combined with various other catalyst components. For example, in one embodiment, the catalyst composition includes a cocatalyst. As used herein, a "cocatalyst" is a substance capable of converting the procatalyst to an active polymerization catalyst. The cocatalyst may include halides such as chlorides, alkyls, or aryls of aluminum, lithium, zinc, tin, cadmium, beryllium, magnesium, and combinations thereof. In an embodiment, the cocatalyst is a hydrocarbyl aluminum cocatalyst represented by the formula $R_3Al$ wherein each R is an alkyl, cycloalkyl, aryl, or hydride radical; at least one R is a hydrocarbyl radical; two or three R radicals can be joined in a cyclic radical forming a heterocyclic structure: each R can be the same or different, and each R, which is a hydrocarbyl radical, has 1 to 20 carbon atoms, and preferably 1 to 10 carbon atoms. In a further embodiment, each alkyl radical can be straight or branched chain and such hydrocarbyl radical can be a mixed radical, i.e., the radical can contain alkyl, aryl, and/or cycloalkyl groups Nonlimiting examples of suitable radicals are: methyl, ethyl, n-propyl, isopropyl, n-butyl, isobutyl, tert-butyl, n-pentyl, neopentyl, n-hexyl, 2-methylpentyl, n-heptyl, n-octyl, isooctyl, 2-ethylhexyl, 5,5-dimethylhexyl, n-nonyl, n-decyl, isodecyl, n-undecyl, n-dodecyl.

Nonlimiting examples of suitable hydrocarbyl aluminum compounds are as follows: triisobutylaluminum, tri-n-hexylaluminum, diisobutylaluminum chloride, di-n-hexylaluminum chloride, isobutylaluminum dichloride, n-hexylaluminum dichloride, diisobutylhexylaluminum, isobutyldihexylaluminum, trimethylaluminum, triethylaluminum, tri-n-propylaluminum, triisopropylaluminum, tri-n-butylaluminum, tri-n-octylaluminum, tri-n-decylaluminum, tri-n-dodecylaluminum. In an embodiment, the cocatalyst is selected from triethylaluminum, triisobutylaluminum, tri-n-hexylaluminum, diisobutylaluminum chloride, and di-n-hexylaluminum chloride.

In an embodiment, the cocatalyst is a hydrocarbyl aluminum compound represented by the formula $R_nAlX_{3-n}$ wherein n=1 or 2, R is an alkyl, and X is a halide or alkoxide.

In an embodiment, the cocatalyst is triethylaluminum. The molar ratio of aluminum to titanium is from about 5:1 to about 1000:1, or from about 10:1 to about 200:1, or from about 15:1 to about 150.1, or from about 20.1 to about 100:1 In another embodiment, the molar ratio of aluminum to titanium is about 45:1.

The catalyst system can include one or more external electron donors. The external electron donors can be, for instance, one or more selectivity control agents and/or one or more activity limiting agents.

In an embodiment, the catalyst composition includes a selectivity control agent. As used herein, a "selectivity control agent" is a compound added independent of procatalyst formation and contains at least one functional group that is capable of donating electrons to a metal atom. In an embodiment, the selectivity control agent donor may be selected from one or more of the following: an alkoxysilane, an amine, an ether, a carboxylate, a ketone, an amide, a carbamate, a phosphine, a phosphate, a phosphite, a sulfonate, a sulfone, and/or a sulfoxide.

In an embodiment, the catalyst composition includes an activity limiting agent (ALA). As used herein, an "activity limiting agent" ("ALA") is a material that reduces catalyst activity at elevated temperature (i.e., temperature greater than about 85° C.). An ALA inhibits or otherwise prevents polymerization reactor upset and ensures continuity of the polymerization process. Typically, the activity of Ziegler-Natta catalysts increases as the reactor temperature rises. Ziegler-Natta catalysts also typically maintain high activity near the melting point temperature of the polymer produced. The heat generated by the exothermic polymerization reaction may cause polymer particles to form agglomerates and may ultimately lead to disruption of continuity for the polymer production process. The ALA reduces catalyst activity at elevated temperature, thereby preventing reactor upset, reducing (or preventing) particle agglomeration, and ensuring continuity of the polymerization process.

The activity limiting agent may be a carboxylic acid ester, a diether, a poly(alkene glycol), poly(alkene glycol)ester, a diol ester, and combinations thereof. The carboxylic acid ester can be an aliphatic or aromatic, mono- or poly-carboxylic acid ester. Nonlimiting examples of suitable monocarboxylic acid esters include ethyl and methyl benzoate, ethyl p-methoxybenzoate, methyl p-ethoxybenzoate, ethyl p-ethoxybenzoate, ethyl acrylate, methyl methacrylate, ethyl acetate, ethyl p-chlorobenzoate, hexyl p-aminobenzoate, isopropyl naphthenate, n-amyl toluate, ethyl cyclohexanoate, propyl pivalate and pentyl valerate.

In one embodiment, the catalyst system includes a mixed external electron donor. A mixed external electron donor comprises at least two of the following components: (1) a first selectivity control agent, (2) a second selectivity control agent; and (3) an activity limiting agent.

In an embodiment, the selectivity control agent and/or activity limiting agent can be added into the reactor separately. In another embodiment, the selectivity control agent and the activity limiting agent can be mixed together in advance and then added into the reactor as a mixture. In the mixture, more than one selectivity control agent or more than one activity limiting agent can be used. In an embodiment, the mixture is dicyclopentyldimethoxysilane and isopropyl myristate, dicyclopentyldimethoxysilane and poly (ethylene glycol)laurate, dicyclopentyldimethoxysilane and isopropyl myristate and poly(ethylene glycol)dioleate, methylcyclohexyldimethoxysilane and isopropyl myristate, n-propyltrimethoxysilane and isopropyl myristate, dimethyldimethoxysilane and methylcyclohexyldimethoxysilane and isopropyl myristate, dicyclopentyldimethoxysilane and n-propyltriethoxysilane and isopropyl myristate, and dicyclopentyldimethoxysilane and tetraethoxysilane and isopropyl myristate, and combinations thereof.

In one embodiment, the catalyst composition includes any of the foregoing external electron donors in combination with any of the foregoing activity limiting agents.

The catalyst system as described above has been found to be particularly well suited for producing the heterophasic polymer composition of the present disclosure.

In addition to the first phase polymer and the second phase polymer, the polypropylene composition of the present disclosure can contain various other additives and ingredients. For instance, the polypropylene composition can contain mold release agents, antistatic agents, slip agents, antiblocks, UV stabilizers, heat stabilizer (e.g. DSTDP), colorants/tints, and the like. In one embodiment, the polymer composition can contain an antioxidant or two, such as a hindered phenolic antioxidant and a phosphite antioxidant. The polymer composition can also contain an acid scavenger such as a metal stearate, a hydrotalcite, or zinc oxide. Each of the additives can be present in the polymer composition generally in an amount less than about 3% by weight, such as in an amount less than about 2% by weight, such as in an amount less than about 1% by weight, such as in an amount less than about 0.5% by weight, and generally in an amount greater than about 0.001% by weight.

In one embodiment, a polymer composition can contain a nucleating agent, such as an alpha-nucleating agent. The nucleating agent can generally be present in an amount greater than about 0.001% by weight and generally in an amount less than about 1% by weight, such as in an amount less than about 0.5% by weight, such as in an amount less than about 0.3% by weight.

Polymer compositions made according to the present disclosure have excellent impact resistance properties. The impact resistance properties of the polymer, however, depend upon various factors. For example, for a polymer composition having a melt flow rate of from about 100 g/10 min to about 150 g/10 min, the polymer composition can have an IZOD impact strength at 23° C. of greater than about 30 J/m, such as greater than about 35 J/m and generally less than about 100 J/m. For a polymer composition having a melt flow rate of from about 40 g/10 min to about 90 g/10 min, the polymer composition can have an IZOD impact resistance of greater than about 40 J/m, such as greater than about 50 J/m, such as greater than about 60 J/m, and generally less than about 1000 J/m. For polymer compositions having a melt flow rate of from about 2 g/10 min to about 30 g/10 min, the polymer composition can have an IZOD impact resistance of greater than about 100 J/m, such as greater than about 130 J/m, such as greater than about 160 J/m, such as greater than about 200 J/m. In one aspect, the polymer composition can have a melt flow rate of less than about 25 g/10 min and can have an IZOD impact resistance of greater than about 300 J/m, such as greater than about 35 J/m, such as greater than about 400 J/m, such as greater than about 450 J/m.

Polymer compositions made according to the present disclosure can have a flexural modulus of greater than about 800 MPa to about 2000 MPa including all increments of 1 MPa therebetween. For instance, the flexural modulus can be greater than about 1000 MPa and generally less than about 1500 MPa.

Due to the physical properties of the polypropylene composition of the present disclosure the composition is well suited to producing molded articles. The polypropylene composition, for instance, can be used in injection molding, extrusion molding, and compression molding applications.

The polymer composition is particularly well suited to producing storage containers. The storage container, for instance, may be food packaging.

In addition to food containers, various other storage containers can be made in accordance with the present disclosure. For instance, larger storage containers can be made using the polymer composition of the present disclosure.

In addition to various containers, any suitable molded article can be made according to the present disclosure that would benefit from the excellent balance of properties. For instance, in one embodiment, the polymer composition of the present disclosure can be used to produce vehicle parts, such as automotive interior parts. In addition, the polymer composition of the present disclosure can be used to produce consumer appliance parts or housewares.

The present disclosure may be better understood with reference to the following examples.

EXAMPLES

Heterophasic polypropylene copolymer samples were produced in accordance with the present disclosure and tested for various properties. The heterophasic copolymers were made generally using the process described above in conjunction with a catalyst described above. The catalyst system included an internal electron donor according to Formula II above in which R1 and R4 were methyl groups, R3 was hydrogen and R2 was a cycloalkyl group. The catalyst system also included triethylaluminium as a cocatalyst and an external donor which comprised a combination of pentyl valerate and NPTMS. The catalyst was phthalate-free. The samples were made in a dual reactor setup where the matrix polymer was made in a first gas phase reactor and then the contents of the first reactor were passed to a second gas phase reactor. Ethylene was used as the comonomer. The first polymer phase contained a polypropylene homopolymer.

Sample Nos. 1 through 4 were made in accordance with the present disclosure. Sample Nos. 5 through 8 were made using a commercially available catalyst that is sold by W. R. Grace under the tradename CONSISTA D7600 catalyst.

All of the samples were made using the UNIPOL® PP process.

Polymer pellet samples were produced that were injected molded into specimens. An additive package was added to the samples which included 500 ppm of pentaerythritol tetrakis(3-(3,5-di-tert-butyl-4-hydroxyphenyl)propionate) and 1000 ppm or 750 ppm of tris(2,4-ditert-butylphenyl) phosphite. An acid scavenger was also to the samples. The specimens were injection moulded according to ASTM Test D4101 to produce specimens for flex-mod and MZOD Testing.

In the Table below, MFR was tested by adding a stabilizer package to the reactor powder sample; for example, 0.5% of a 2:2:1 mixture of Cyanox 2246, Irgafos 168, and ZnO.

The following results were obtained:

| Sample | 1 | 2 | 3 | 4 | 5 | 6 | 7 | 8 |
|---|---|---|---|---|---|---|---|---|
| MFR (g/10 min) | 110 | 17 | 50 | 12 | 98 | 18 | 50 | 12 |
| XS (weight %) | 21.7 | 30.1 | | | 22.4 | 30.5 | 25.4 | |
| Mw | 171700 | 272700 | 200200 | 268500 | 172000 | 255600 | 207300 | 273300 |
| Mn | 28700 | 44300 | 32100 | 46500 | 27000 | 37600 | 32100 | 43300 |
| Mw/Mn | 5.98 | 6.15 | 6.23 | 5.77 | 6.37 | 6.8 | 6.46 | 6.31 |
| Et % | 8.0 | 12.1 | 9.5 | 9.3 | 8.6 | 12.1 | 9.9 | 8.8 |
| Ec % | 38.4 | 38.2 | 39.1 | 39.5 | 38.7 | 36.8 | 43.3 | 41.0 |
| Fc % | 20.9 | 31.8 | 24.2 | 23.6 | 22.2 | 32.8 | 22.8 | 21.3 |
| Flexural modulus, (Mpa) | 1282 | 1034 | 1160 | 1311.8 | 1286 | 954 | 1298 | 1285 |
| Tensile stress at yield, (Mpa) | 25 | 19.5 | 23 | 23 | 25 | 20 | 23 | 25 |
| IZOD, 23 C., (J/m) | 36 | 464 | 63 | 136 | 39 | 564 | 65 | 129 |
| IZOD, 0 C., (J/m) | | 121 | | | | 135 | | |
| IZOD, −20 C. (J/m) | | 82 | | | | 82 | | |
| Total VOC (ppm) | 45 | 30 | 40 | 25 | 98 | 89 | 80 | 46 |
| VOC-C12, (ppm) | 11 | 4.9 | 9 | 4 | 23 | 12.7 | 15 | 6.8 |
| Oligomer - C12 (ppm) | 149 | 102 | 59.5 | 29 | 330 | 227 | 324 | |
| Oligomer - C15 (ppm) | 215 | 122 | 147 | 74.5 | 355 | 245 | 377 | |
| Oligomer - C18 (ppm) | 272 | 129 | 191 | 198 | 357 | 250 | 368 | |
| Oligomer - C21 (ppm) | 259 | 132 | 212 | 112.5 | 386 | 291 | 363 | |
| Total Oligomer (ppm) | 895 | 485 | 610 | 414 | 1428 | 1013 | 1431 | |
| Koenig B-rubber | 0.86 | 0.88 | 0.88 | 0.88 | 0.83 | 0.82 | 0.85 | |

As shown above, polymer compositions made according to the present disclosure displayed a dramatic reduction in VOC content. These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only and is not intended to limit the invention so further described in such appended claims.

What is claimed:

1. A polymer composition comprising:

a first polymer phase comprising a polypropylene polymer;

a second polymer phase combined with the first polymer phase, the second polymer phase comprising a propylene and ethylene random copolymer, the propylene and ethylene random copolymer containing ethylene in an amount from about 20% to about 55% by weight, the second polymer phase comprising from about 10% to about 45% by weight based on a total weight of the first polymer phase and the second polymer phase; and wherein the polymer composition has a total oligomer content expressed by the following equation:

$$\text{total oligomer} < 260 * \text{MFR}^{0.32};$$

wherein the total oligomer content comprises the combined content of $C_{12}$ oligomer, $C_{15}$ oligomers, $C_{18}$ oligomers and $C_{21}$ oligomers expressed in ppm, wherein the first polymer phase and the second polymer phase have been Ziegler-Natta catalyzed and contains a phthalate-free internal electron donor comprising

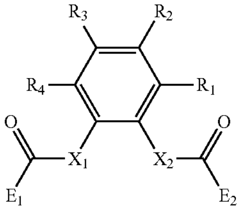

wherein $R_1$ and $R_4$ are each a hydrocarbyl group having from 1 to 20 carbon atoms, and wherein at least one of $R_2$ and $R_3$ is hydrogen, and wherein at least one of $R_2$ and $R_3$ comprises a substituted or unsubstituted hydrocarbyl group having from 5 to 15 carbon atoms, the hydrocarbyl group having a branched or linear structure or comprising a cycloalkyl group having from 4 to 15 carbon atoms, and where $E_1$ and $E_2$ are the same or different and selected from the group consisting of an alkyl having 1 to 20 carbon atoms, a substituted alkyl having 1 to 20 carbon atoms, an aryl having 6 to 20 carbon atoms, a substituted aryl having 6 to 20 carbon atoms, or an inert functional group having 1 to 20 carbon atoms and optionally containing heteroatoms, and wherein $X_1$ and $X_2$ are each O, S, or $NR_5$ and wherein $R_5$ is a hydrocarbyl group having 1 to 20 carbon atoms or is hydrogen.

2. The polymer composition of claim 1, wherein a $C_{12}$ oligomer content is less than about 300 ppm at a melt flow rate of up to 300 g/10 min, is less than about 200 ppm at a melt flow rate of up to 150 g/10 min, and is less than about 100 ppm at a melt flow rate of up to 25 g/10 min.

3. The polymer composition of claim 1, wherein the polymer composition has a total oligomer content of less than 1000 ppm with a melt flow rate of lower than 80 g/10 min.

4. The polymer composition of claim 1, wherein the polypropylene polymer of the first polymer phase is a polypropylene homopolymer.

5. The polymer composition of claim 1, wherein the first polymer phase has a xylene soluble content of less than about 6% by weight.

6. The polymer composition of claim 1, wherein the first polymer phase has a total oligomer content of less than 800 ppm with a melt flow rate lower than 80 g/10 min.

7. The polymer composition of claim 1, wherein the second polymer phase has a Koenig B value of greater than 0.85.

8. The polymer composition of claim 1, wherein the polymer composition has a xylene soluble content of from about 10% by weight to about 50% by weight.

9. The polymer composition of claim 1, wherein the polymer composition has a melt flow rate of from about 2 g/10 min to about 150 g/10 min, when measured at a temperature of 230° C. and at a load of 2.16 kg.

10. The polymer composition of claim 1, wherein the polymer composition has a VOC content of less than about 70 ppm.

11. The polymer composition of claim 1, wherein the polymer composition has a C12 VOC content of less than 15 ppm.

12. The polymer composition of claim 1, wherein the second polymer phase is in the form of polymer particles dispersed within the first polymer phase.

13. The polymer composition of claim 1, wherein the second polymer phase is formed in the presence of the first polymer phase.

14. A molded article formed from the polymer composition of claim 1.

15. The molded article of claim 14 wherein the molded article is an injection molded article.

16. A storage container formed from the polymer composition of claim 1.

17. An automotive part formed from the polymer composition of claim 1.

18. A process for producing a polymer composition comprising:

forming a first polymer phase in a first reactor, the first polymer phase comprising a polypropylene polymer; and forming a second polymer phase in the presence of the first polymer phase in a second reactor, the second polymer phase comprising a propylene and ethylene random copolymer; and wherein the first polymer phase and the second polymer phase are formed in the presence of a phthalate-free Ziegler-Natta catalyst including an internal electron donor, the internal electron donor comprising:

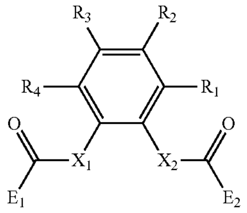

wherein $R_1$ and $R_4$ are each a hydrocarbyl group having from 1 to 20 carbon atoms, and wherein at least one of $R_2$ and $R_3$ is hydrogen, and wherein at least one of $R_2$ and $R_3$ comprises a substituted or unsubstituted hydrocarbyl group having from 5 to 15 carbon atoms, the hydrocarbyl group having a branched or linear structure or comprising a cycloalkyl group having from 4 to 15 carbon atoms, and where $E_1$ and $E_2$ are the same or different and selected from the group consisting of an alkyl having 1 to 20 carbon atoms, a substituted alkyl having 1 to 20 carbon atoms, an aryl having 6 to 20 carbon atoms, a substituted aryl having 6 to 20 carbon atoms, or an inert functional group having 1 to 20 carbon atoms and optionally containing heteroatoms, and wherein $X_1$ and $X_2$ are each O, S, or $NR_5$ and wherein $R_5$ is a hydrocarbyl group having 1 to 20 carbon atoms or is hydrogen;

and wherein the polymer composition comprising the first polymer phase and the second polymer phase has a C12 oligomer content of less than about 200 ppm.

19. The process of claim 18, wherein the polypropylene polymer contained in the first polymer phase is a polypropylene homopolymer, the polypropylene homopolymer having a xylene soluble content of less than about 6%, the second polymer phase comprising from about 20% by weight to about 55% by weight ethylene, the second polymer phase comprising from about 10% by weight to about 45% by weight based on a total weight of the first polymer phase and the second polymer phase, and wherein the polymer composition has a xylene soluble content of from about 10% to about 50% by weight and a melt flow rate of from about 2 g/10 min to about 150 g/10, the polymer composition having a total oligomer content expressed by the following equation:

$$\text{total oligomer} < 260 * MFR^{0.32};$$

wherein the total oligomer content comprises the combined content of $C_{12}$ oligomer, $C_{15}$ oligomers, $C_{18}$ oligomers and $C_{21}$ oligomers expressed in ppm.

* * * * *